No. 672,026. Patented Apr. 16, 1901.
H. E. WARRICK.
FEEDING MECHANISM FOR THRESHING MACHINES.
(Application filed July 12, 1900.)
(No Model.)
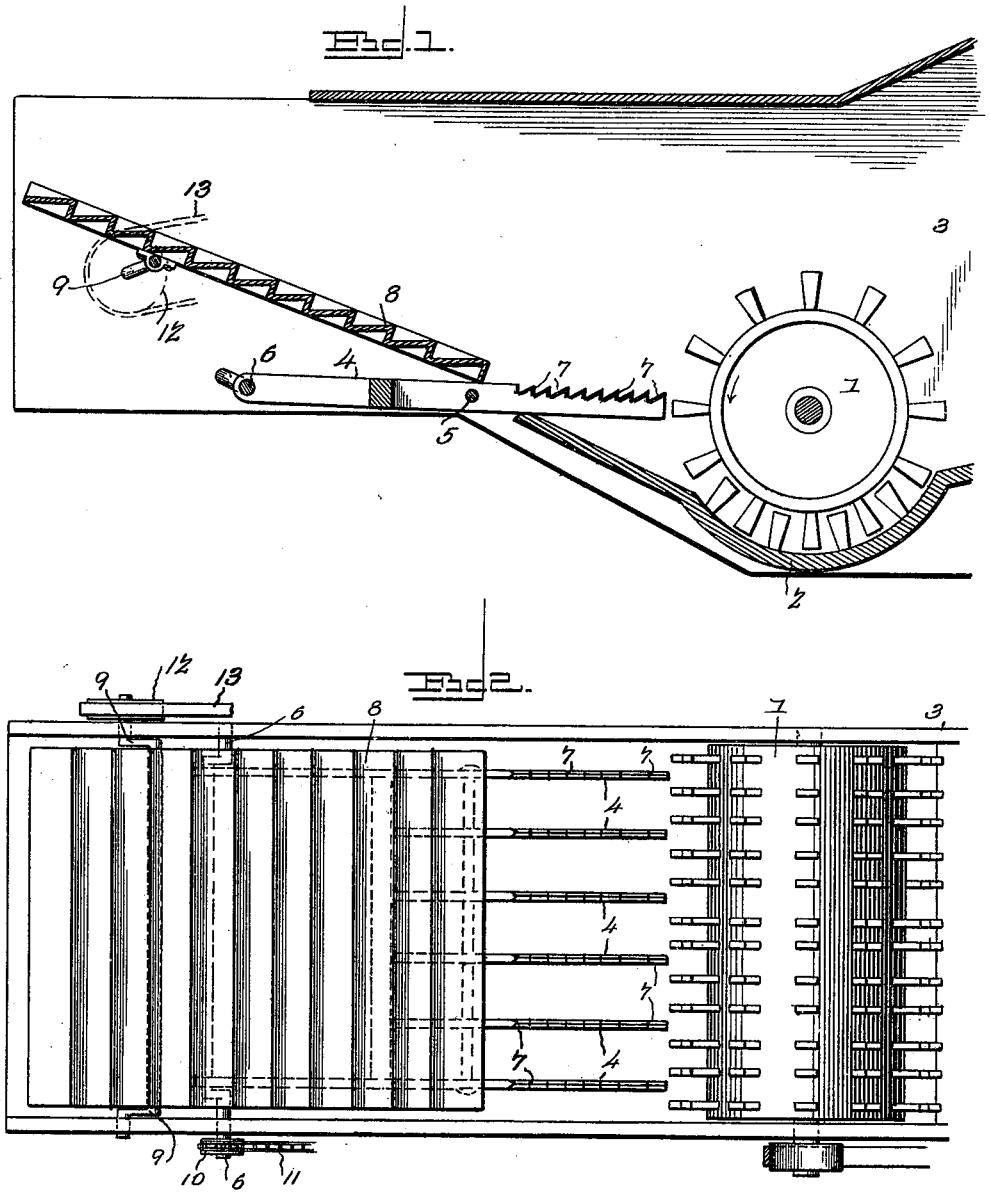

United States Patent Office.

HARVEY E. WARRICK, OF PIPESTONE, MINNESOTA.

FEEDING MECHANISM FOR THRESHING-MACHINES.

SPECIFICATION forming part of Letters Patent No. 672,026, dated April 16, 1901.

Application filed July 12, 1900. Serial No. 23,384. (No model.)

*To all whom it may concern:*

Be it known that I, HARVEY E. WARRICK, a citizen of the United States, residing at Pipestone, in the county of Pipestone and State of Minnesota, have invented a new and useful Feeding Mechanism for Threshing-Machines, of which the following is a specification.

My invention is an improved feeding mechanism for threshing-machines; and it consists in the peculiar construction and combination of devices hereinafter fully set forth, and pointed out in the claims.

In the accompanying drawings, Figure 1 is a vertical longitudinal sectional view of the feeding mechanism for threshing-machines embodying my improvements, showing the same combined in operative relation with the threshing mechanism. Fig. 2 is a top plan view of the same.

The threshing-cylinder 1 and concave 2 are of the usual or may be of any preferred construction. Disposed in the mouth of the inclosing case 3 of the threshing mechanism are a series of feed-bars 4, which are connected together by any suitable means, as at 5, and disposed at appropriate intervals, and the said feed-bars are connected to and reciprocated by a crank-shaft 6. The inner ends of the feed-bars rest freely on a support and are directed toward the inner side of the threshing-cylinder. Said feed-bars are provided on their upper sides for a suitable extent from their inner ends with serrated teeth 7, the edges of which are sharpened. The feed-pan 8 is reciprocated and its outer end supported by and pivoted on a crank-shaft 9. The inner end of the said feed-pan rests upon the feed-bars and travels thereon. It will be observed by reference to the drawings that the stroke of the feed-bars is less than the stroke of the feed-pan and that the teeth of the feed-bars are smaller than those of the feed-pan. In operation the feed-bars are reciprocated at a higher rate of speed than the feed-pan. The shafts 6 9 may be rotated by any suitable means. As here shown, the shaft 6 is provided at one end with a sprocket-wheel 10, driven by an endless sprocket-chain 11 from a suitable power-shaft, which may be a shaft either of the threshing mechanism or of the band-cutting and feeding mechanism employed in connection therewith, and the crank-shaft 9 is provided at one end with a pulley 12, driven by an endless belt 13 from an appropriate shaft of the threshing mechanism or band-cutting and feeding mechanism operated in connection therewith.

The difference in the respective rates of speed of the shafts 6 and 9 is indicated by the difference in size of the sprocket-wheel 10 and pulley 12, the former being smaller than the latter, assuming that the endless chain 11 and belt 13 are run at the same linear speed.

It will be understood from the foregoing and by reference to the drawings that the inner end of the feed-pan may be readily raised from the feed-bars to render the latter accessible, and it will be further understood that the inner end of the feed-bars may be readily raised from the threshing-cylinder to render the threshing mechanism accessible.

In the operation of my invention the grain which is delivered from the band-cutter and feeder onto the feed-pan 8 is by the motion and inclination of the feed-pan fed upon the feed-bars 7, which serve to carry the same to the threshing-cylinder, where the grain is engaged by the teeth of the cylinder, which rotates in the direction indicated by the arrow in Fig. 1, the threshing-teeth serving to draw the grain downward between the feed-bars and subject the same to the coaction of the teeth of the threshing-cylinder and concave. Such bundles of grain as pass through the band-cutting and feeding mechanism without having their bands cut are by the coaction of the teeth of the threshing-cylinder and the feed-bars presented to the cutting edges of the teeth 7 of the feed-bars, which teeth serve to cut the bands thereof and unbind the said bundles.

It will be understood that the feed-pan and feed-bars serve to feed the grain uniformly to the threshing mechanism and that the disposition of the inner ends of the feed-bars near the inner side of the threshing-cylinder causes the grain to be subjected to the action of the threshing-cylinder and concave throughout the entire extent of the latter and that the efficiency of the threshing mechanism is increased. Furthermore, the coaction of the feed-bars and the teeth of the threshing-cylinder disposes the grain as it is fed to the threshing mechanism in such manner that it cannot become clogged and choked in masses between the threshing-cylinder and concave. By thus providing means for evenly feeding the grain to the threshing mechanism and for disposing the grain in such manner as to facilitate the operation of the threshing mechanism the power required to operate the threshing mechanism is materially reduced.

Having thus described my invention, I claim—

1. The combination with a threshing-cylinder and concave, of feed-bars having their inner ends directed toward the feed side of the cylinder and resting freely on a support, said feed-bars having teeth on their upper sides provided with sharpened cutting edges, a revoluble crank-shaft supporting the outer ends of said feed-bars, the latter being thereby reciprocated by said crank-shaft, and said crank-shaft forming a pivot which enables the inner ends of the feed-bars to be raised to render accessible the threshing-cylinder and concave, a feed-pan having its inner end supported and adapted to travel on said reciprocating feed-bars, and a revoluble crank-shaft supporting the outer end of said feed-pan, whereby said feed-pan is reciprocated, said crank-shaft forming a pivot and thereby adapting the inner end of said feed-pan to be raised to render the feed-bars accessible, said reciprocating feed-pan and feed-bars coacting to feed the grain to the threshing-cylinder, substantially as described.

2. The combination with a threshing-cylinder, and concave, of reciprocating feed-bars having their inner ends directed toward the feed side of the cylinder, said feed-bars having teeth on their upper sides, and a reciprocating feed-pan having its lower, inner end supported and traveling on said feed-bars, said feed-pan forming an abutment to hold the grain while the teeth of the feed-bars move backward under the grain, the teeth of said feed-bars being smaller than those of the grain-pan and means for reciprocating said feed-pan and feed-bars, the latter at a higher rate of speed than the former, substantially as described.

In testimony that I claim the foregoing as my own I have hereto affixed my signature in the presence of two witnesses.

HARVEY E. WARRICK.

Witnesses:
P. A. EVART,
J. H. MORGAN.